United States Patent [19]

Haga et al.

[11] 4,288,251

[45] Sep. 8, 1981

[54] REINFORCED ELECTROCAST ZIRCONIA REFRACTORIES

[75] Inventors: Toshikatsu Haga; Hiroyuki Fukuda, both of Iwaki; Hiroshi Shinoda, Gifu; Hideharu Hayakawa, Nagoya, all of Japan

[73] Assignees: Kureha Kagaku Kogyo Kabushiki Kaisha, Tokyo; NGK Insulators, Ltd., Aichi, both of Japan

[21] Appl. No.: 123,452

[22] Filed: Feb. 21, 1980

Related U.S. Application Data

[63] Continuation-in-part of Ser. No. 47,102, Jun. 11, 1979, abandoned.

[51] Int. Cl.³ .............................................. C04B 35/48
[52] U.S. Cl. ..................................................... 501/105
[58] Field of Search ............................................ 106/57

[56] References Cited

U.S. PATENT DOCUMENTS

| | | | |
|---|---|---|---|
| 2,553,265 | 5/1951 | Mochel | 106/57 |
| 2,903,373 | 9/1959 | Sandmeyer | 106/57 |
| 2,919,994 | 1/1960 | Steimke, Jr. | 106/57 |
| 3,620,781 | 11/1971 | Garvie | 106/57 |
| 3,754,950 | 8/1973 | Cevales | 106/57 |

Primary Examiner—O. R. Vertiz
Assistant Examiner—Mark Bell
Attorney, Agent, or Firm—Wegner & Bretschneider

[57] ABSTRACT

Disclosed herein is the reinforced electrocast zirconia refractories showing an extremely high bending strength obtained by the heat-treatment of stabilized electrocast zirconia refractories under the specified conditions.

2 Claims, 1 Drawing Figure

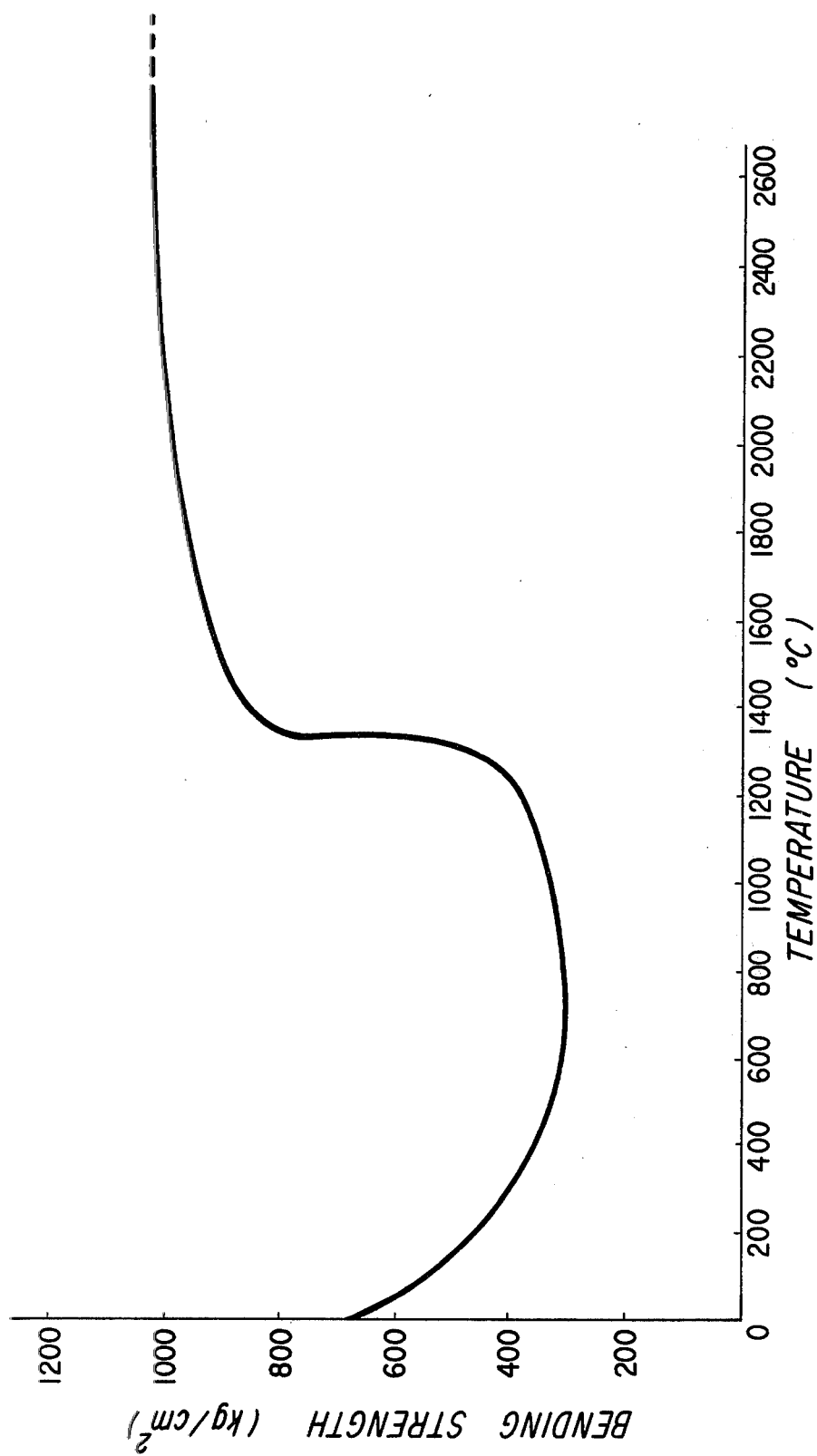

1

REINFORCED ELECTROCAST ZIRCONIA REFRACTORIES

CROSS-REFERENCE TO RELATED APPLICATION

The present application is a continuation-in-part of application Ser. No. 47,102, filed June 11, 1979, now abandoned.

SUMMARY OF INVENTION

In an aspect of the invention, there is provided the reinforced electrocast zirconia refractories with a raised strength, of which the intermediate part in the direction of thickness is not impaired for long period of operation even when applied on the region exposed to an ultra high temperature.

BRIEF EXPLANATION OF DRAWING

The attached drawing illustrates the relation between the bending strength of a piece of the refractories determined at the room temperature and the temperature of heating in the case where the stabilized electrocast zirconia refractories are heated in an atmosphere containing 4% by volume of oxygen, by a graph.

DETAILED DESCRIPTION OF THE INVENTION

The present invention concerns the reinforced electrocast zirconia refractories showing an extremely high bending strength obtained by heat-treatment of stabilized electrocast zirconia refractories under the specified conditions.

Since the electrocast zirconia refractories have markedly higher strength than the calcined zirconia refractories, in spite of the difficulties in their production, they are used in parts exposed to an ultra-high temperature such as the lining of the furnaces operated at an ultra-high temperature.

However, in the case where the electrocast zirconia refractories are applied on the lining of the ultra-high temperature petroleum oil cracking furnace, the refractories which are positioned in the region at a temperature of 600° to 1400° C. are apt to be impaired at the intermediate part in the direction of thickness, and accordingly it is necessary to exchange the impaired electrocast zirconia refractories frequently. This fact has caused the disadvantage due to the large repair cost and the interruption of the operation.

We have found, during our studies of several refractory materials, that the electrocast zirconia refractories having an extremely high strength and being stable for long period of operation when applied on the region exposed to the ultra-high temperature as has been described above are obtainable by further heat-treating of the stabilized electrocast zirconia refractories, as a result have completed the present invention.

The term herein used, "stabilized electrocast zirconia refractories", means the material which is obtained by a series of processes in which an electrofused melt of a stabilized zirconia blend is poured into a mold and then the melt is solidified from its lower portion by forcibly cooling the bottom part of the mold, the above-mentioned stabilized zirconia blend having been obtained by blending zirconia for instance, calcined grain of zirconia and fused grains of zirconia, as the base material and a stabilizing agent selected from the group consisting of alkaline earth metal compounds, for instance, calcium oxide, magnesium oxide, etc. and rare earth compounds for instance, yttria, and moreover means the zirconia refractories characterized by the following properties:

The properties of the above-mentioned stabilized electrocast zirconia refractories are:

| Structural properties: | |
|---|---|
| bulk density | 5.0 to 5.7 g/cm$^3$ |
| apparent porosity | less than 7% by volume |
| size of zirconia block crystals | a representative dimension of less than about 400 micrometer and more than 50% of microscopically visual field is occupied by zirconia block crystals with a representative dimension of less than 200 micrometer |

| Compositional properties: (% by weight) | |
|---|---|
| $ZrO_2$ | 89.0 to 97.5 |
| $SiO_2$ | less than 1 |
| $Al_2O_3$ | less than 1 |
| above-mentioned stabilizing agent | 2.5 to 8.0 |
| other components | less than 1. |

Hereupon, in the case where the stabilizing agent is an oxide of alkaline earth metal, its content is 2.5 to 3.9% by weight, and in the case where it is an oxide of rare earth element, its content is 5.5 to 8.0% by weight.

| Specificity of strength: | |
|---|---|
| bending strength | more than 500 kg/cm$^2$. |

As is recognizable from the above-mentioned properties, the stabilized electrocast zirconia refractories herein mentioned should be clearly differentiated from the conventional calcined zirconia refractories.

In the present invention, the zirconia refractories having a remarkably raised bending strength, at least of 700 kg/cm$^2$, are obtained by heating the above-mentioned stabilized electrocast zirconia refractories in an atmosphere containing at least about 1.5% by volume of oxygen in a conventional kiln or furnace using fuel oils, fuel gas or electricity as a heat source, under the following specified conditions:

The above-mentioned specified conditions of heating comprises the heating of the stabilized electrocast zirconia refractories in the above-mentioned kiln or furnace until the temperature within the furnace attains to 600° C., and from that time point where the temperature within the furnace attains to about 1400° C., the heat control to maintain the rate of temperature raising, particularly to less than 85° C./hour and thereafter the maintaining the temperature within the furnace at least about 1400° C. and at least for 30 minutes.

Since even when the temperature within the furnace is maintained higher than 1400° C. no favorable influence on the improvement of the strength of the thus obtained zirconia refractories is observed, the actually adoptable final temperature within the furnace may be maintained at 1400° to 1500° C. Although the above-mentioned rate of temperature raising within the furnace should be less than 85° C./hour, the too small rate of temperature raising makes the time period for raising the temperature within the furnace to 1400° C. longer and so, the too small rate of temperature raising is not preferable commercially.

The technical section of the above-mentioned conditions of heating for obtaining the reinforced zirconia refractories is explained as follows:

Part of zirconia in the electrocast zirconia refractories has been transformed into a state of unstable oxides of lower order under the reducing action of electrode carbon or lining carbon used in the electrofusing step of the raw material and in the melt casting step of the production process, so that the texture of the electrocast zirconia refractories generally has come to be fragile. However, when such electrocast zirconia refractories are heated in an atmosphere containing oxygen at least about 1.5% by volume, the unstable and partly reduced zirconia in the refractories restores its stabilized state of $ZrO_2$, and when the heating temperature reaches 1400° C. or higher, the re-sintering of zirconia proceeds rapidly to markedly reinforce the refractories. It is to be noted, however, that the raised oxygen content in the heating atmosphere to higher than 30% by volume does not bring about any noticeable further improvement of the strength of the refractories and hence it is not economical. Accordingly the upper limit of the oxygen content in the heating atmosphere used in the present invention is practically said to be 30% by volume. If the heating operation during the period of temperature raising from 600° to 1400° C. is carried out by controlling the rate of temperature raising at less than 85° C./hour, the texture of the obtained electrocast refractories is very dense to bring about further improvement of its strength.

The relationship between the bending strength of the refractories and the temperature of heating in cases where the above-mentioned stabilized electrocast zirconia refractories are heated under the above-mentioned conditions is as shown in the graph of the attached drawing. As is recognized from the graph, when the temperature of heating of the stabilized electrocast zirconia refractories attains to about 1400° C., the bending strength of this refractories rapidly increases, but over that temperature, no more increase is observed in the bending strength. In this connection, it is natural that the temperature of heating of the stabilized electrocast zirconia refractories in the heating furnace should not be higher than the melting point (2500° C.) of the refractories.

The stabilized electrocast zirconia refractories which have been actually used for lining of an ultra-high temperature oil cracking furnace or such, have been suffered from damages in its intermediate region along the thickness thereof in use in the region of the furnace exposed to a temperature of 600° to 1400° C., whereas the electrocast zirconia refractories that have been subjected to the reinforcing treatment according to the present invention remain perfectly free from such damage and require no repairs for about 3 times as long period of time as in the case of the stabilized electrocast zirconia refractories not yet reinforced, resulting in amazingly lessened repair expenses and loss resulting from furnace shutdown. Further, the reinforcing treatment of the refractories according to the present invention can be practiced at low cost since no specific equipment nor labor is required neither.

Now, the present invention is described in further detail by way of an embodiment thereof.

EXAMPLE 1

The present example illustrates the production of the stabilized electrocast zirconia refractories for use in the present invention.

Fused grains of zirconia and calcia were mixed in the weight ratio of 96.5:3.5 (calculated in terms of oxides) and electrofused in a 1,000 kVA Héroult type electric arc furnace, and the melt was teemed into a carbon-lined mold (internal dimensions of 500 mm×500 mm×500 mm) having at its bottom a water-cooling basin made of thick steel plates provided with a water-cooling hose. After cooling for 1.5 hours, the casting (solidified mass) was taken out of the mold and left on a flat carbon plate to cool naturally for 24 hours, thereby obtaining a casting with a height of 350 mm. Then, the upper portion of this casting was cut out at 150 mm in height by a diamond cutter and the remaining lower portion was given as the product.

The chemical composition of the thus obtained product was as follows:

| | |
|---|---|
| $SiO_2$ | 0.32% by weight |
| CaO | 3.30% by weight |
| $Fe_2O_3$ | 0.10% by weight |
| $TiO_2$ | 0.15% by weight |
| $Al_2O_3$ | 0.20% by weight |
| $ZrO_2(+HfO_2)$ | Balance |

Three samples with an equal size of 20 mm×20 mm×150 mm were cut out from the above-mentioned product by using a diamond cutter, and the bending strength of these samples was measured at the room temperature by supporting each sample at three points with a span of 120 mm according to JIS (Japanese Industrial Standard) R-2213. The mean value of the measured bending strength was 650 kg/cm².

Also, polished samples were prepared from the same product and the crystal state of these samples was observed by a reflection miccroscope. It was found that each of the samples was composed of block crystals with sizes of less than about 400 micron, and about 60 to 70% of the entire area of the visual field under the microscope was occupied by the crystals with sizes of less than 200 micron.

Further, the result of determination of the bulk density and the apparent porosity of the samples of the product by the method in JIS (Japanese Industrial Standard) R-2205 were as follows:

bulk density: 5.50 g/cm³
apparent porosity: 2.0% by volume

EXAMPLE 2

Of the stabilized zirconia refractories produced by the process described in Example 1, the upper portion 150 mm from the top, in which voids have been formed was removed by cutting with a diamond cutter and the remained portion was further cut perpendicularly to obtain the stabilized electrocast zirconia refractories of the size of 50 mm×50 mm×200 mm. The thus prepared electrocast zirconia refractories were heat-treated in a high temperature baking tunnel kiln heated slowly at a rate of 80° C./hour with an atmosphere controlled to contain 4% by volume of oxygen for a period during which the temperature was raised to 1500° C. and then for 120 minutes at a temperature of 1500° C. After that, the refractories were naturally cooled to be the reinforced product. The outlook of the thus obtained product was pale yellow in colour without showing any crack. The bending strength of the product determined by the method JIS-R-2213 was 850 kg/cm².

In the case where a petroleum oil cracking furnace lined with the product was actually operated for experiment, the life of the furnace was about 3 years, whereas the life of the same type furnace lined with the stabilized electrocast zirconia refractories not heat-treated was only about one year.

EXAMPLE 3

The stabilized electrocast zirconia refractories obtained by the processes described in Example 1 was heat-treated as the procedures described in Example 2 except for changing the rate of temperature-raising and the oxygen content of the atmosphere of the furnace to those shown in the following Table: The outlook and the blending strength of the thus obtained product are shown in Table.

TABLE

| | The present invention | | Comparative examples | |
|---|---|---|---|---|
| Rate of temperature raising (°C./hour) | 60 | 60 | 95 | 110 |
| Oxygen content in atmosphere (% by volume) | 4 | 1 | 4 | 4 |
| Outlook of product | light yellow crack not observed | black yellow | — crack observed | — many cracks observed |
| Bending strength (kg/cm²) | 830 | 300 | 400 | could not be determined |

As is recognized in Table, the product obtained by the heat-treatment under the conditions adopted by the present invention did not show the crack and was remarkably reinforced, however, the products (Comparative examples) obtained by the heat treatment under the conditions out of the scope of the present invention showed rather the deteriorated bending strength.

What is claimed is:

1. A reinforced electrocast zirconia refractory obtained by heating fully stabilized electrocast zirconia refractories containing 89.0 to 97.5% by weight of $ZrO_2$, less than 1% by weight of $SiO_2$, less than 1% by weight of $Al_2O_3$ and 2.5 to 8.0% by weight of a stabilizing agent to a temperature of at least about 1400° C. in an atmosphere containing from 1.5 to 30% volume of oxygen, a raising rate of temperature being less than 85° C./hour during the period from the time when temperature reaches about 600° C. to the time when the temperature reaches about 1400° C., and maintaining said stabilized electrocast zirconia refractory at the temperature of at least about 1400° C. at least for 30 minutes.

2. The reinforced electrocast zirconia refractory according to claim 1, wherein the bending strength of said heated refractory at a temperature of at least 1400° C. is over about 700 Kg/cm².

* * * * *